March 4, 1924.
A. M. SEEGER
AUXILIARY SUPPORT
Filed May 31, 1921
1,485,629
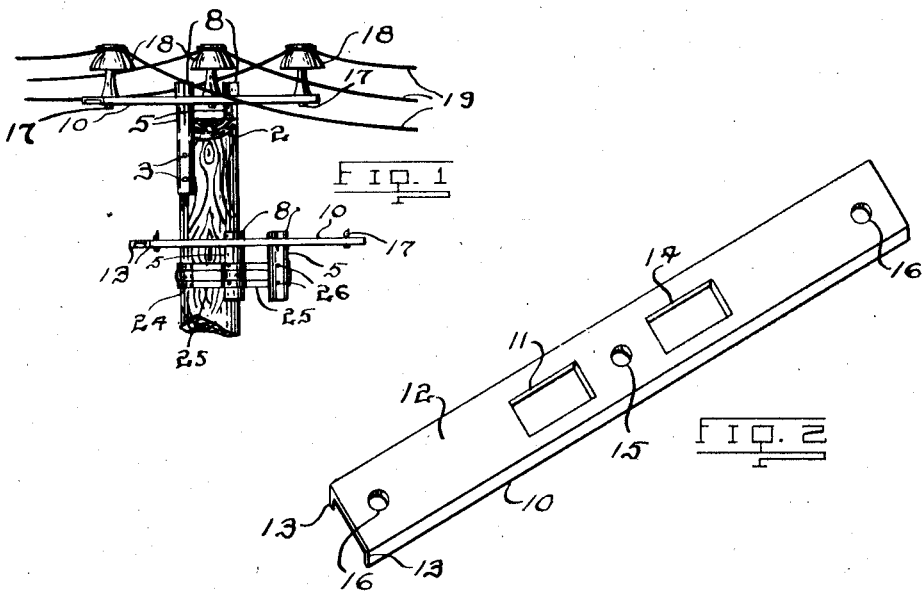
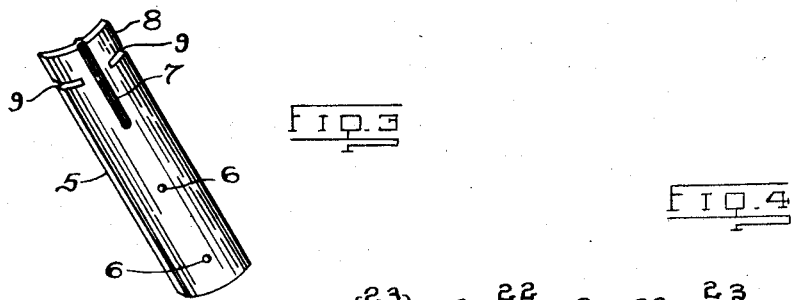
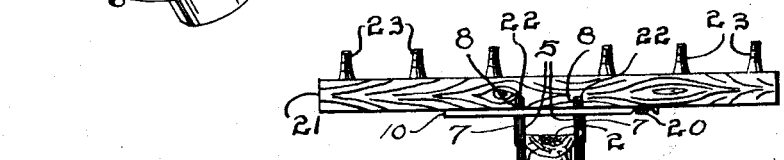
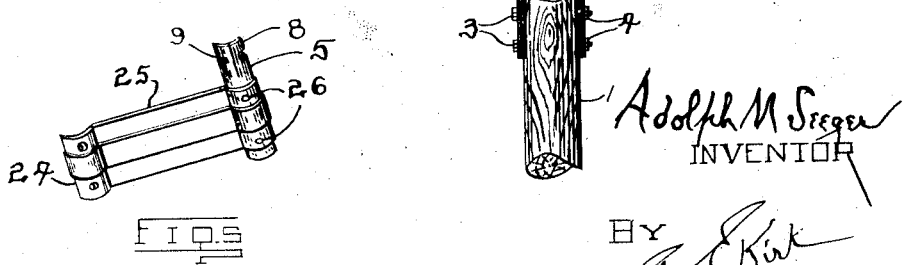
Adolph M Seeger
INVENTOR
BY Geo E Kirk
ATTORNEY Patented Mar. 4, 1924.

1,485,629

UNITED STATES PATENT OFFICE.

ADOLPH M. SEEGER, OF TOLEDO, OHIO.

AUXILIARY SUPPORT.

Application filed May 31, 1921. Serial No. 473,884.

*To all whom it may concern:*

Be it known that I, ADOLPH M. SEEGER, a citizen of the United States of America, residing at Toledo, Lucas County, Ohio, have invented new and useful Auxiliary Supports, of which the following is a specification.

This invention relates to auxiliary supports or carriers for mounting upon poles. This invention has utility when incorporated in cross arm mountings for line poles.

Referring to the drawings:—

Fig. 1 is a perspective view of an embodiment of the invention as a three-wire transmission cross arm for line poles, and supplemental cross arm mounting;

Fig. 2 is a perspective view of the channel cross arm of Fig. 1;

Fig. 3 is a perspective view of one of the top clamping plates of Fig. 1;

Fig. 4 is a side elevation of the device assembled for a top major cross arm; and Fig. 5 is a perspective view of a lower cross arm clamping plate.

A line pole 1 is shown as having near its top 2 bolts 3 as anchoring means extending through the pole 1 and nuts 4 to assemble clamping plates 5 as to the pole 1, by passing through holes 6 in said plates. For additional rigidity and to hold the plates more firmly against twisting as to the pole 1, a rib 7 is formed in the plates 5 through the head 8 which is defined from the plate proper 5 by notches 9.

In assembling minor cross arm or channel member 10 with a pair of engaging members or clamping plates 5, one of the plates 5 may be in position as to the pole 1 and elongated seat or slot 11 may be so disposed as to the plate 5 extending the long way of this slot 11, and then turned to bring web 12 of the channel 10 at the sides of the slots 11 into the notches 9. This channel member 10 has flanges 13 extending downwardly from the web 12 to give the channel load carrying rigidity.

The second mounting plate may have its head 8 thrust through the other slot 14 similar to the slot 11 and then turned into opposing relation as to the first plate 5 drawn up against the pole 1 to have the bolts 3 protrude through the opening 6 and the nuts 4 may then be assembled thereon to complete the mounting of the channel 10 upon the pole 1. The engaging members 5 coacting with the seats 11, 14, serve to hold the channel 10 against transverse shifting. That is, the channel may not move angularly as to the pole 1, nor may it move upward or downward. There may be a longitudinal movement by sliding of the channel 10 diametrically as to the pole 1. In this mounting by means of these clamp members or plates 5 the channel 10 may be carried with slight clearance above the top 2 of the pole 1 in an effective firm mounting which may in a measure serve as a shield or cap for the pole top 2. If there be a mounting with slight clearance as to the pole top 2, central seat 15 as well as terminal seats 16 in the channel 10 may serve as cross arm features either for lightning arresters, telegraph, or telephone lines. The clamping plates or members 5 are drawn toward each other by the means comprising nuts 4 co-acting with the bolts 3, the heads 8 of the members 5 being in the seats 11, 14, of the web 12; it is thus apparent that the plates or members 5 may be bolted to the pole 1 by the bolts 3 and nuts 4 in such a position as to hold the structural shape or cross arm 10 above the pole.

Herein bolts 17 are shown as mounting insulators 18 carrying transmission lines 19 as to upper channel or auxiliary cross arm 10. For lighter wire and greater number to be carried, bolts 20 may mount major cross arm 21 having seats 22 therein for the head 8 of the plates 5. This major cross arm 21 may carry insulator mounting pins 23.

In the event of a cross arm below the cap cross arm, such may be mounted as shown in Fig. 1 by clamping plates 24 having bracket extensions 25. These plates and bracket extensions 24, 25 may be assembled in pairs to be connected by bolts 26 to the plates 5. As so assembled auxiliary channels 10 may be carried in the identical way with the top channels 10.

In the disclosure herein there is accordingly provided parts which are of light weight, which may be conveniently assembled in position as to the pole by one lineman on a pole without any tackle or special rig. Furthermore, without weakening the pole a central transmission line may be carried directly above the pole by the device herein thus giving a maximum for line clearance for uniform spacing of three lines in transmission. This means a considerable saving in pole costs for a given height in the carrying of lines. Further, the device is of great strength for its light weight and may be readily produced in stamp operations for quantity production.

What is claimed and it is desired to secure by United States Letters Patent is:—

1. A crossarm mounting device comprising a structural member to be supported, an engaging member provided with seats having interfitting coaction with the structural member to maintain the structural member against torsion strains, there being means fixing the engaging position of the engaging member as to the structural member, and anchoring means for sustaining the engaging member and through the engaging member carrying the structural member.

2. A crossarm mounting device comprising a structural member to be supported horizontally, a vertically extending engaging member provided with an interfitting seat coacting with the structural member to maintain the structural member against torsion strain, there being means fixing the engaging position of the engaging member as to the structural member for holding against relative shifting, and anchoring means for mounting the engaging means on a line pole thereby to sustain the engaging member for carrying the structural member.

3. A crossarm mounting device comprising a member to be supported having a horizontal portion with seats and a vertical stiffening flange, a pair of relatively adjustable engaging members in opposing relation having locking engagement with said seats in said horizontal portion, a support, and anchoring means for the engaging members as to the support for maintaining the engaging members in spaced adjusted relation.

4. A crossarm mounting device comprising a channel bar having a pair of intermediate seats, opposing relatively adjustable headed members engaging the bar seats for mounting the bar, and means for drawing the members toward each other in said seats for effecting mounting of the bar by said members.

5. A crossarm mounting device comprising a channel bar having a pair of longitudinally extending slots, and opposing relatively adjustable engaging members notched to provide heads to be assembled through said slots in mounting the bar.

6. In a crossarm structure, an auxiliary support for mounting upon a line pole, comprising a channel bar having seats for devices to be carried, and a pair of slots in the channel of the web, a pair of clamp members headed to engage in the bar slots and hold the bar against transverse shifting, and anchoring bolts for clamping the members in opposing pole engaging position.

7. The combination with a line pole, of a channel crossarm, clamping plates embracing the pole for mounting the crossarm as a pole cap transversely of the axis of the pole terminally thereabove, and plate anchoring means coacting with the pole independently of the crossarm for fixing the position of the plates in crossarm holding position.

8. The combination of a pole, a clamp comprising a pair of relatively adjustable members, means for bolting the members to the pole for extending thereabove, and a crossarm engaged by the extending clamp members transversely of the top of the pole intercepting the extended axis of said pole, said crossarm being thereby mounted by the members independently of engagement directly with said means.

9. A crossarm mounting device comprising a structural shape having a horizontal web provided with a pair of oppositely extending slots, a pair of opposing concave plates having notches for coacting with the edges of said slots and providing heads above said web, and a crossarm having recesses engaging said heads.

In witness whereof I affix my signature.

ADOLPH M. SEEGER.